(12) United States Patent
Miceli et al.

(10) Patent No.: US 6,522,284 B2
(45) Date of Patent: Feb. 18, 2003

(54) RADAR CROSS-SECTION MEASUREMENT SYSTEM FOR ANALYSIS OF ELECTRICALLY INSULATIVE STRUCTURES

(75) Inventors: Gilbert F Miceli, Denver, CO (US); Michael Parisi, Boylestown, PA (US)

(73) Assignee: Hot/Shot Radar Inspections, LLC, Lakewood, CO (US)

( * ) Notice: Subject to any disclaimer, the term of this patent is extended or adjusted under 35 U.S.C. 154(b) by 63 days.

(21) Appl. No.: 09/745,329

(22) Filed: Dec. 20, 2000

(65) Prior Publication Data

US 2002/0109622 A1 Aug. 15, 2002

Related U.S. Application Data

(63) Continuation-in-part of application No. 09/680,745, filed on Oct. 7, 2000, now Pat. No. 6,246,355.
(60) Provisional application No. 60/171,548, filed on Dec. 22, 1999, and provisional application No. 60/191,444, filed on Mar. 23, 2000.

(51) Int. Cl.[7] .......................... G01S 13/88; G01S 13/86; G01S 13/89
(52) U.S. Cl. .............................. 342/22; 342/25; 342/27; 342/52; 342/53; 342/54; 342/175; 342/195; 342/196; 342/357.1; 342/357.6; 701/200; 701/207; 701/213
(58) Field of Search .................. 342/1–12, 21, 342/22, 25, 27, 28, 52–58, 61–75, 89, 118, 147, 165–175, 189–197, 357.01–357.17, 450–465, 162; 701/200, 207–216; 324/337, 642; 345/440

(56) References Cited

U.S. PATENT DOCUMENTS

| 3,978,396 | A | * | 8/1976 | Inouye et al. | 324/337 |
| 4,414,643 | A | * | 11/1983 | Meyer | 345/440 |
| 5,315,561 | A | * | 5/1994 | Grossi | 342/22 |
| 5,512,834 | A | * | 4/1996 | McEwan | 324/642 |
| 5,652,594 | A | * | 7/1997 | Costas | 342/162 |
| 5,835,053 | A | * | 11/1998 | Davis | 342/22 |
| 5,883,591 | A | * | 3/1999 | McEwan | 342/22 |
| 5,905,455 | A | * | 5/1999 | Heger et al. | 342/22 |
| 6,091,354 | A | * | 7/2000 | Beckner et al. | 342/22 |
| 6,246,355 | B1 | * | 6/2001 | Miceli et al. | 342/22 |
| 6,271,670 | B1 | * | 8/2001 | Caffey | 324/642 |

* cited by examiner

Primary Examiner—Bernarr E. Gregory
(74) Attorney, Agent, or Firm—Townsend and Townsend and Crew LLP

(57) ABSTRACT

A method and system for identifying an anomaly in an electrically insulative component of a structure, such as an insulator on a utility or telecommunications pole, are provided. Locations for the structure and electrically insulative component are identified. A radar signal is propagated towards the electrically insulative component with a radar antenna while the radar antenna is motion along a navigation path in the vicinity of the structure. A reflected radar signal is received from the electrically insulative component, from which a determination is made whether the electrically insulative component contains the anomaly.

39 Claims, 11 Drawing Sheets

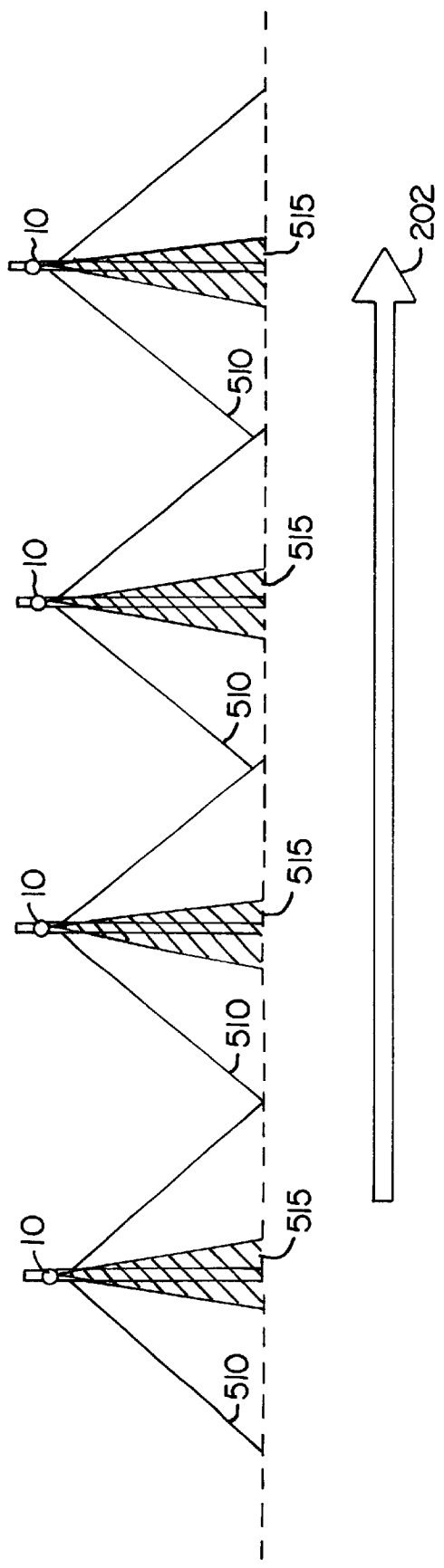

RADAR CROSS-SECTION MEASUREMENT SYSTEM FOR ANALYSIS OF ELECTRICALLY INSULATIVE STRUCTURES

CROSS-REFERENCES TO RELATED APPLICATIONS

This application is a continuation-in-part application of application Ser. No. 09/680,745, entitled "RADAR CROSS-SECTION MEASUREMENT SYSTEM FOR ANALYSIS OF WOODEN STRUCTURES," filed Oct. 7, 2000 by Gilbert F. Miceli and Michael Parisi, now U.S. Pat. No. 6,246,355, which is herein incorporated by reference in its entirety for all purposes. This application claims the priority of Provisional Appl. No. 60/171,548, filed Dec. 22, 1999 and of Provisional Appl. No. 60/191,444, filed Mar. 23, 2000, both of which are herein incorporated by reference for all purposes.

BACKGROUND OF THE INVENTION

The present invention relates generally to a method and system for analyzing insulative structures with radar. More particularly, the invention relates to a method and system for detecting and characterizing anomalies in wooden utility poles and related insulative component structures.

The power-utility-system infrastructure alone in North America includes approximately 150,000,000 wooden pole structures. A similarly large number of wooden poles are additionally used by the telecommunications industry. Wood remains valuable as a material for constructing power and telecommunications poles because of its cost effectiveness and reasonable durability. Such poles are, nevertheless, subject to deterioration over time, not only from climatic effects, but also from biological and mechanical assaults. For example, biological deterioration may result from the activity of decay fungi, wood-boring insects, or birds. Woodpeckers have been known to bore vertical tunnels in wooden poles greater than twelve feet in length. Mechanical damage can result from such things as vehicular collisions or shotgun impacts. Consequently, each wooden pole in the system must be inspected periodically and a determination made whether to replace the pole based on the strength of the pole. Typically, poles are inspected on a 5–9 year cycle.

Various methods currently exist for evaluating pole strength, generally requiring direct physical contact with the pole. Such methods rely primarily on sampling techniques in which the strength of the pole is deduced from an assessment of its characteristics at the sampled points. Such sampling is typically performed in the region of the pole easily accessible by a technician, i.e. between about six feet above the ground to about two feet below the ground, so that only about 10% of the pole is even within the sampling region. Crossarms, which are positioned near the tops of the poles, are rarely examined for deterioration. Current methods also tend to include significant reliance on the qualitative assessment of the technician examining the pole. Individual visits to every pole to perform the inspection additionally result in substantial costs for maintaining the pole infrastructures.

In addition to the functional integrity of the utility pole being dependent on the structural soundness of the wooden pole and crossarm structures, it may also depend on the condition of other insulative pole structures. For example, many utility poles are equipped with "insulators," which are knobs that are affixed to the poles, usually on the crossarms, and are used to support the utility lines. The insulators may be fabricated of appropriate insulative material, such as rubber, fiberglass, ceramic, or porcelain. The insulators are also exposed to weather and biological deterioration that may adversely affect their performance. In some cases, cracks may form in the insulators and later be filled with water or metal. The change in electrical character may result in flashover, which may trip circuitry and in some cases cause a fire that burns the wooden crossarm, or causes even greater damage.

There is accordingly room for improving the reliability of wooden-pole deterioration measurements by examining substantially the entirety of the structures and automating the evaluation of their strength. In addition, the cost for assessing the structures can be reduced by using a system that eliminates the need to have each pole visited individually.

SUMMARY OF THE INVENTION

Thus, embodiments of the invention are directed to a method and system for analyzing insulative structures. In certain embodiments, a wooden structure, such as a utility or telecommunications pole, is analyzed, while in other embodiments the invention is more generally applicable to other insulative components of structures.

In embodiments directed to the analysis of a wooden structure, a location for the wooden structure is identified. A first radar signal is propagated towards the wooden structure with a radar antenna while the radar antenna is motion along a navigation path in the vicinity of the wooden structure. A reflected radar signal is received from the wooden structure, from which a determination is made whether the wooden structure contains a structural anomaly. The wooden structure may be identified by imaging the wooden structure, such as with a charge coupled device or infrared camera. In certain embodiments, longitude and latitude positions for the wooden structure are ascertained with a global positioning system. The location of the wooden structure may also be identified by reflecting a laser signal from it.

In various embodiments, a second radar signal modulated in accordance with a pulse compression scheme is propagated towards the wooden structure. The first and second radar signals may be provided by the same radar subsystem or by separate radar subsystems in different embodiments. The determination of whether the wooden structure contains a structural anomaly may be made in one embodiment from data extracted from the reflected radar signal by calculating a density distribution for the wooden structure. The calculated density distribution may be used to designate closed-volume regions within the wooden structure having a density less than a threshold density relative to a mean density for the structure thereby identifying them as possible structural anomalies.

Other embodiments of the invention are directed to identifying an anomaly in an insulative component of a structure. In such embodiments, a location for the structure and a position for the insulative component relative to the structure are identified. A first radar signal is propagated towards the insulative component with a radar antenna while the radar antenna is in motion along a navigation path in the vicinity of the structure. A reflected radar signal in received, from which it is determined whether the insulative component contains the anomaly. Various aspects of the invention used for the analysis of wooden structures may also be incorporated in the identification of anomalies in insulative components. In particular, propagating a second radar signal modulated in accordance with a pulse compression scheme may be performed such that the reflected radar signal includes signal components originating from both the first and second radar signals.

BRIEF DESCRIPTION OF THE DRAWINGS

These and other embodiments of the present invention, as well as its advantages and features are described in more detail in conjunction with the text below and the attached figures, in which similar reference numerals are used throughout the several drawings to refer to like elements. Various components of the same type may be distinguished by following the reference label with a hyphen and a second label that distinguishes among the components.

DESCRIPTION OF THE SPECIFIC EMBODIMENTS

Embodiments of the invention include a radar cross-section measurement system for the analysis of insulative structures, such as utility and telecommunications poles that include wooden and other insulating components. In accordance with one embodiment, a vehicle is operated in the vicinity of the poles to be examined, systematically making appropriate radar measurements of the poles. In one embodiment, the vehicle is a land-based vehicle such as a truck, while in other embodiments, the vehicle is an airborne vehicle such as a helicopter or other aircraft. The airborne vehicle may be preferred in circumstances where the pole is not easily accessible by land, while the land-based vehicle may be preferred in circumstances where airspace restrictions limit access by air. The measurements are used by a computational analysis system to determine the existence and location of any anomalies within any of the examined poles. A report of the results is prepared and forwarded to a client.

Figure 1A:
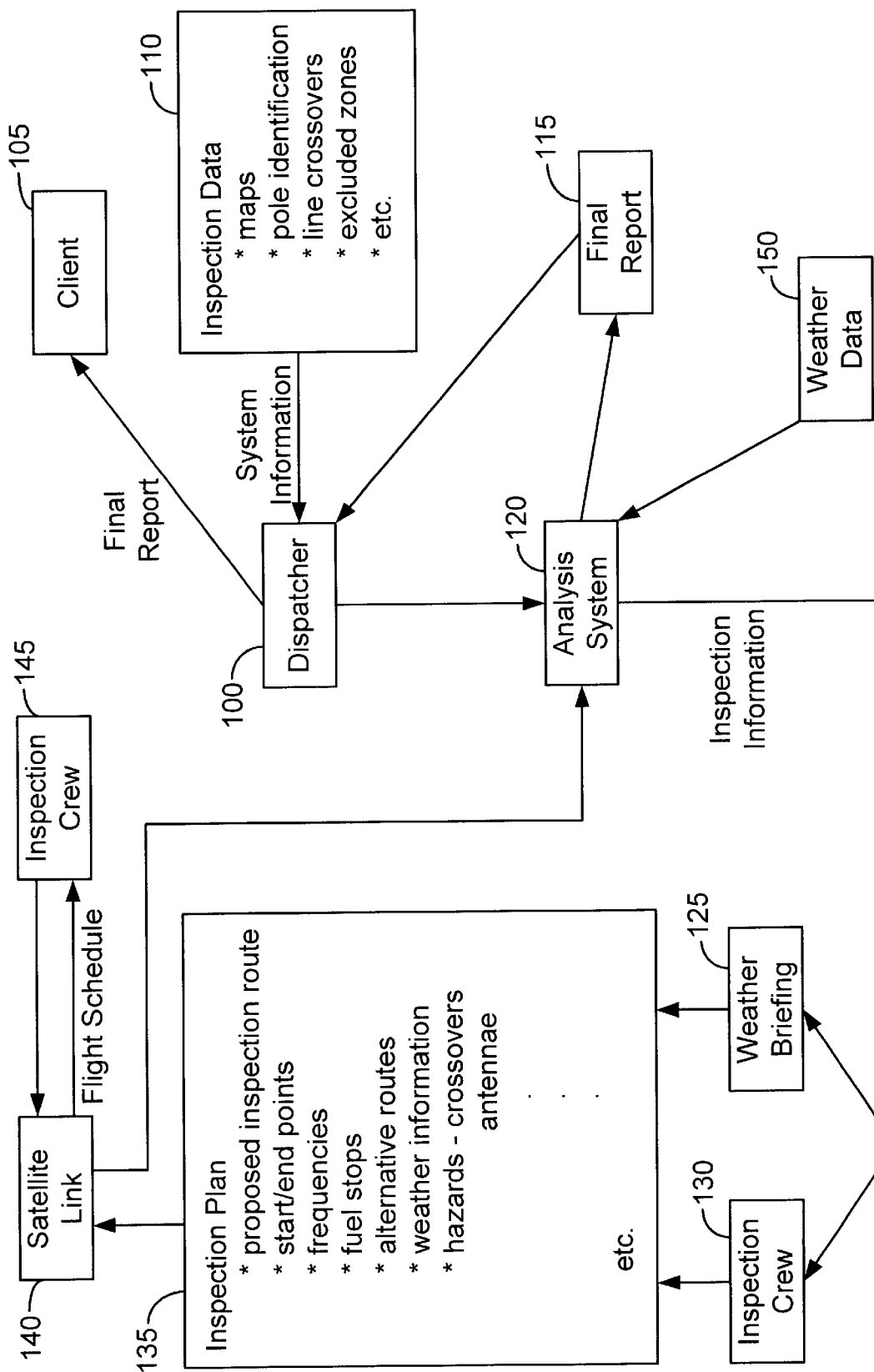
FIG. 1(a) is a block diagram showing the relationship between various elements of the system in one embodiment of the invention.
Figure 1B:
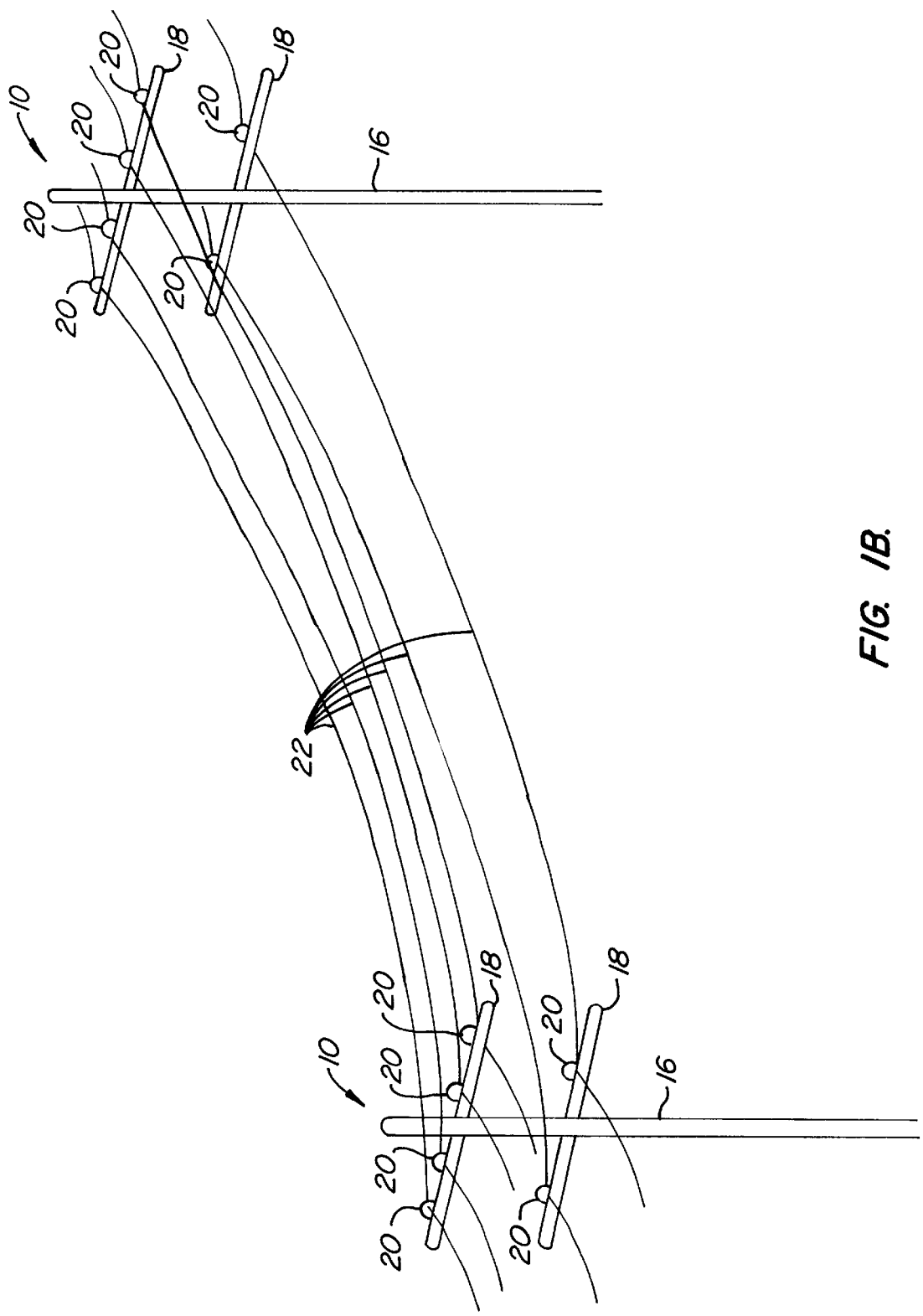
FIG. 1(b) is a perspective drawing illustrating some insulative structures that may be analyzed with embodiments of the invention.

The overall structure of one such system is illustrated in FIG. 1(a) in the form of a block diagram showing in particular the flow of data through the system. The system functions centrally with a dispatcher 100 who is responsible for coordination of various other aspects of the system. In operation, a client 105 requests a report analyzing certain poles 10, the structure of which is shown schematically in FIG. 1(b). The poles 10 generally may be described in terms of three distinct components, not all of which are necessarily included in a given structure: a central member 16, a crossarm 18, and an insulator 20. The central member 16 is embedded approximately vertically in the ground, with the crossarms 18 positioned approximately perpendicular to the central member 16. The insulators 20 are affixed to the crossarms 18, with wires 22 suspended in a catenary between poles 10 at the insulator 20s.

The central members 16 are generally fabricated from wood, although other insulative material, such as fiberglass, may also be used. The crossarms 18 are generally fabricated from the same material as the central members 16, although this is not a requirement for the invention. The insulators 20 are generally fabricated from rubber, fiberglass, ceramic, or porcelain, all of which behave as electrically insulative material.

The dispatcher collects system information in the form of inspection data 110. Such inspection data 110 may be provided by the client or obtained from other sources to identify the poles 10 to be analyzed and the environment in which they are located. For example, to identify the environment in which the poles 10 are located, the inspection data 110 may include, among other information, maps of the region, information identifying any line crossovers that may exist proximate the poles 10, and information identifying zones where the inspection vehicle 12 (not shown in FIG. 1(a)) is excluded, such as no-fly zones in those embodiments where the inspection vehicle 12 is an aircraft. In the United States, flight-plan data may be obtained from such sources as the Federal Aviation Administration (FAA) or the Aircraft Owners and Pilots Association (AOPA).

Relevant inspection data 110 are provided by the dispatcher 100 to an analysis system 120, which may perform various functions as necessary in the system and as described in greater detail below. As part of one such function, the analysis system 120 combines inspection data 110 with other data relevant for formulating an inspection plan 135. Such other data may also be provided by the dispatcher 100 or may be obtained directly from another source. One example of such relevant other data shown in FIG. 1(a) as being obtained directly from an external source is weather data 150 describing the existing and/or expected weather conditions in the region of the poles 10 to be analyzed. The invention encompasses the use of other data sources relevant to the formulation of an inspection plan 135, such as the locations of hotels, the locations of rental-car companies, the layouts of nearby airports, and others as may occur to those of skill in the art.

In this aspect of the invention, the analysis system 120 acts as a module that uses such information sources to formulate the inspection plan 135. In embodiments using an aircraft as the inspection vehicle 12, the inspection plan 135 may be equivalent to a flight plan for the aircraft. The inspection plan 135 includes such features as a proposed inspection route, including starting points, end points, possible fuel stops, and a list of known possible hazards to the vehicle 12 such as line crossovers or antennae. In addition, the inspection plan 135 may include one or more alternative routes to be followed by the inspection vehicle 12 in the event some barrier to completing the proposed inspection route is encountered. The analysis system 120 may also provide digital system maps 130 and/or a weather briefing 125, each of which may additionally be included in the inspection plan 135. The inspection plan 135 may also include other relevant information communicated by the analysis system 120 that may be useful during the inspection.

The inspection is performed by navigating the inspection vehicle 12 in the vicinity of the poles 10, such as shown in greater detail in FIG. 2 (described below). The inspection vehicle 12 is occupied by an inspection crew 145 which obtains information describing the inspection plan 135 via a satellite link 140 or equivalent communications device. The inspection crew 145 may obtain any of the additional information described above as necessary or desired during its actual navigation around the poles.

As the inspection vehicle 12 is navigated in the region of the poles 10, it performs radar cross-section measurements, described in detail below, collecting signal data that are then provided to the analysis system 120. Such signal data may be provided via the satellite link 140, although alternative methods for providing such data are within the scope of the invention, some of which are described further below. The analysis system 120 uses the received signal data to generate a final report 115, which provides information in summary format identifying the potential anomalies in the poles 10 detected by the system. The final report 115 is communicated back to the dispatcher 100, who may review it and forward it to the client 105 for action, such as making a determination of whether the reported potential anomalies warrant replacement of any of the poles 10.

While FIG. 1(a) and the above description depict a single analysis system 120 and a single satellite link 140, it will be understood that the multiple functions performed by these elements of the system may alternatively be performed by equivalent multiple elements without exceeding the scope of the invention.

Figure 2:
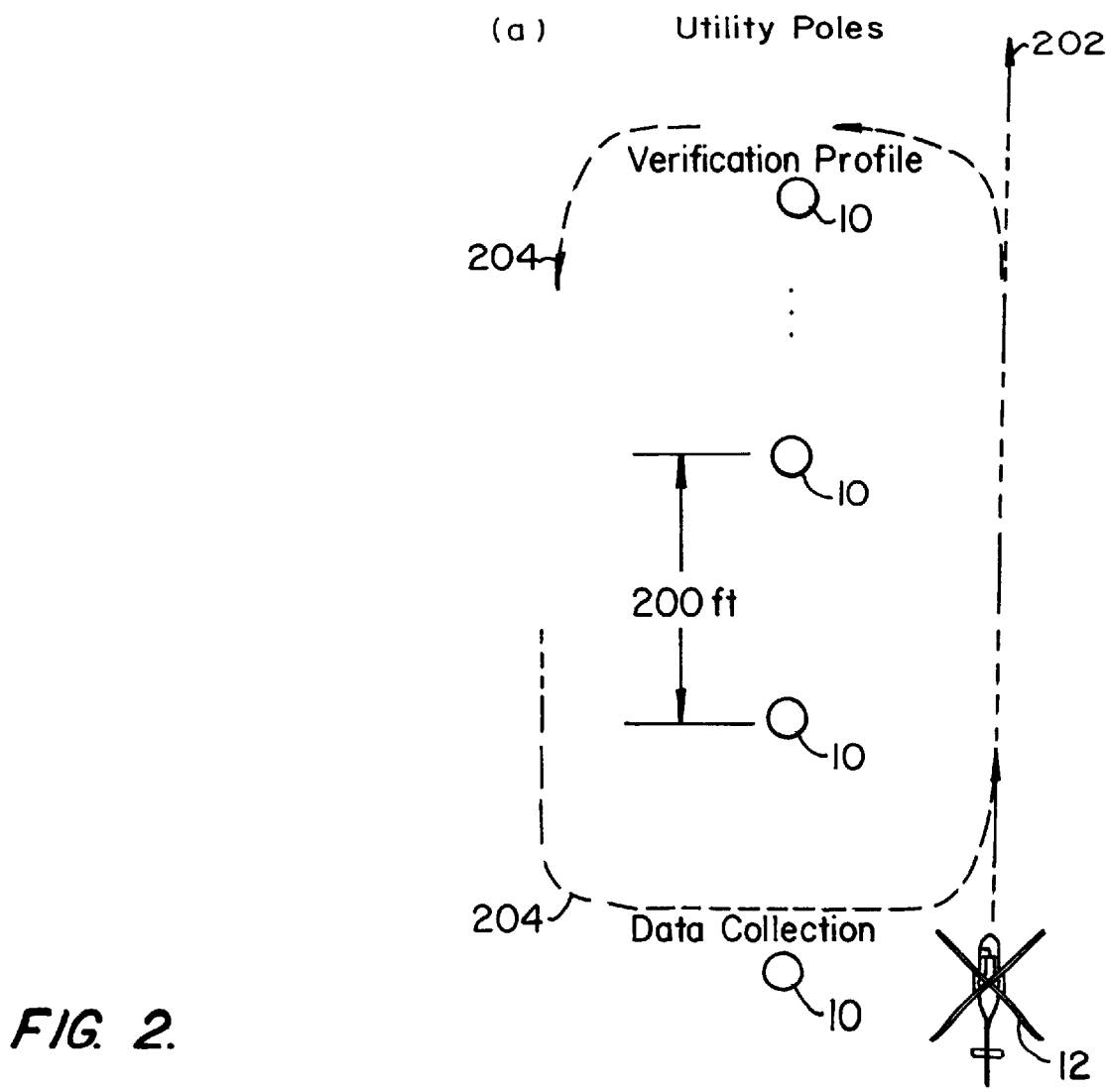
FIG. 2 is a schematic diagram of one possible navigational path that may be taken by the inspection vehicle when taking radar cross-section measurements of poles: part (a) shows a top view of the navigational path and part (b) shows a side view of the navigational path.
Figure 2:
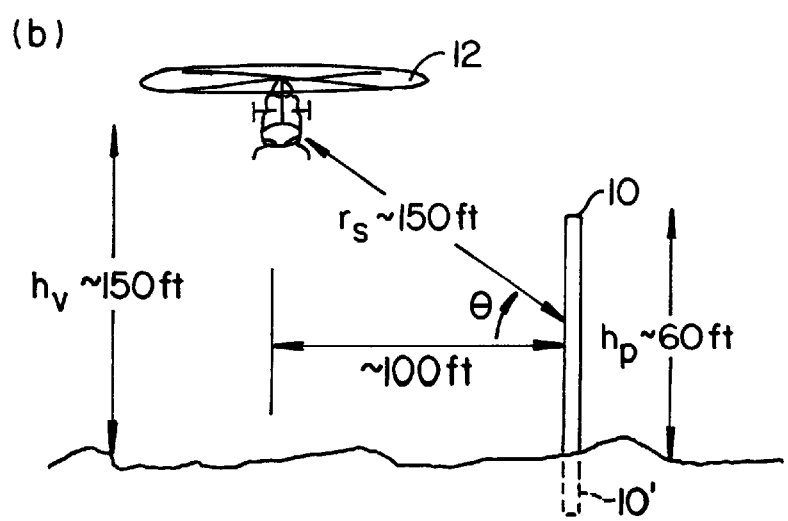

An example of the navigation performed by the inspection vehicle 12 is shown in FIG. 2, in which the inspection vehicle 12 is depicted as a helicopter. Part (a) of FIG. 2 shows a top view of one possible navigational path that may be followed as radar measurements are made. In this example, the inspection vehicle 12 follows an inspection path 202 approximately parallel to a locus defined by the pole positions. As shown in the figure, individual poles 10 are separated by approximately 200 feet, a separation that is typical for utility poles, but the invention readily accommodates any pole separation. When the inspection vehicle detects a potential anomaly in one of the poles 10, it may deviate from the inspection path 202 to follow a verification path 204, which may include doubling back around a set of poles 10, ultimately rejoining the original inspection path to proceed to other as-yet-unexamined poles 10. While following the verification path 204, additional radar cross-section measurements are performed from different orientations with respect to an individual pole, thereby providing supplementary data from which a more accurate characterization of the potential anomaly can be made. In certain instances, the verification path 204 includes a change in relative height of the navigation vehicle 12, as may be appropriate in obtaining supplementary data used to characterize crossarms on the pole 10.

The orientation of the navigation vehicle 12 with respect to an individual pole 10 as it moves along the inspection path 202 is shown schematically in FIG. 2(b). The various distances in the arrangement are intended to be exemplary since other orientations may be used as appropriate to obtain supplementary data. In the illustrated orientation, with a pole having a height $h_p$ of approximately 60 feet, the inspection vehicle 12 may be positioned at a height of about 500 feet. At such a height, with a distance from the pole 10 of about 100 feet, the slant range $r_s$ between the inspection vehicle 12 and the pole 10 may be kept between about 135 and 550 feet, with a depression angle 0 between about 30° and 80°. The underground portion 10' of the pole 10 is preferably examined with radar signals that propagate through the material of the pole 10 without propagating through the ground itself. Identification of anomalies with such an arrangement requires no correction for the variety of electromagnetic speeds that may exist in the ground, depending specifically on the composition of the ground where the pole 10 is located.

Figure 3:
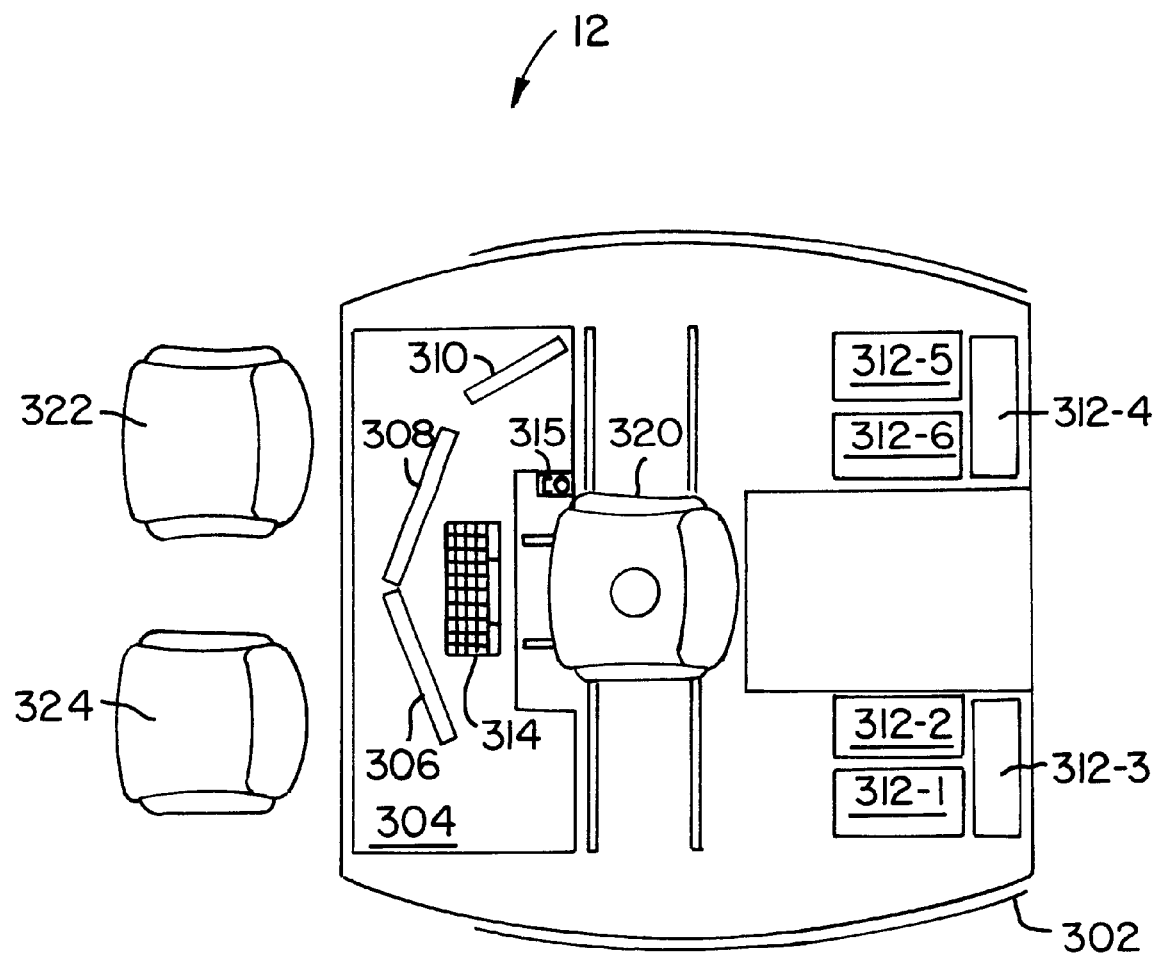
FIG. 3 illustrates one configuration that may be used to equip a navigation vehicle to operate in accordance with an embodiment of the invention.

An example of a radar workstation that may be configured within an inspection vehicle 12 is shown in FIG. 3. The particular configuration illustrated is appropriate, for example, for a helicopter such as an MD Explorer 902 or a Bell Textron 212, 412, or 427 helicopter. The forward compartment of the vehicle includes seat positions 322 and 324 for a pilot and copilot, who navigate the inspection vehicle 12 along the inspection and verification paths 202 and 204. Such navigation is performed in accordance with instructions from an inspection technician 146 (not shown in FIG. 3) occupying seat 320 in a passenger compartment 302 of the inspection vehicle 12. The pilot, copilot, and inspection technician may constitute the inspection crew 145. The inspection technician 146 is equipped with an inspection station 304 from which he monitors results of the inspection on output interaction devices 306, 308, and 310, shown in the exemplary embodiment as computer screens, and issues instructions through input interaction devices 314 and 315, shown in the exemplary embodiment as a keyboard and mouse.

Figure 4:
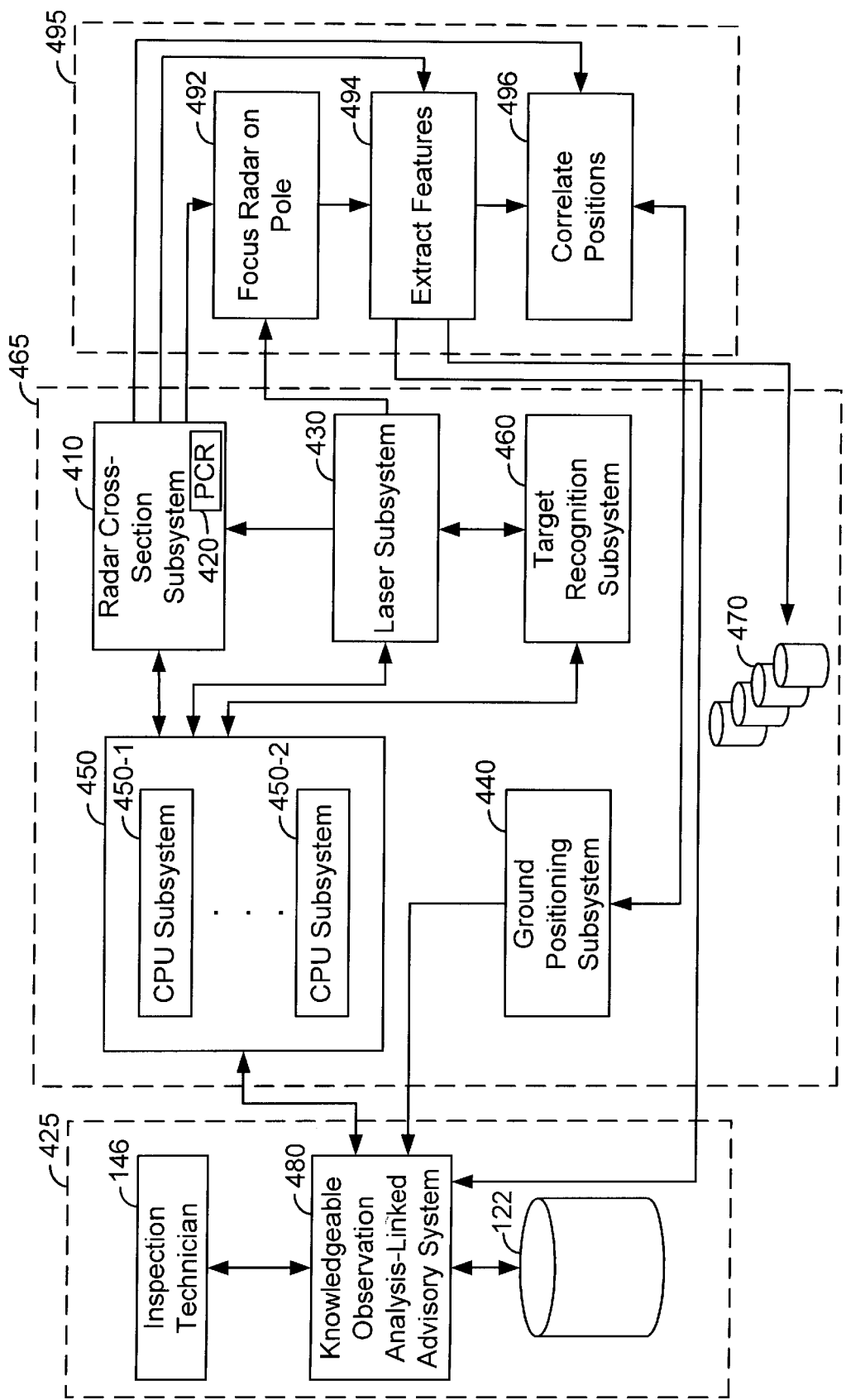
FIG. 4 is a block diagram showing the relationship between various subsystem elements used in analyzing the insulative structures.

The interior of the passenger compartment is additionally equipped with various analytical devices and instruments, which may be positioned in locations designated generally by reference numeral 312. The illustration shows one arrangement that may be used for including six individual pieces of equipment. For particular applications, various components may be substituted and the configuration changed. In one embodiment, the equipment includes the following, the operational interconnection of which is shown in FIG. 4: (1) a radar cross-section subsystem 410 including an antenna and associated hardware for propagating and receiving radar signals; (2) a laser pointing and measuring subsystem 430; (3) a differential global-positioning subsystem (GPS) 440; (4) one or more central processing units (CPUs) 450 for executing software as necessary to operate the various subsystems in combination; (5) a target recognition subsystem 460; and (6) a data-storage subsystem 470 for storing relevant data as needed to operate the various subsystems in combination. In addition, the inspection vehicle 12 may include peripheral components used to insure proper and adequate functioning of the equipment 312. Such peripheral components may include, among others, stabilization platforms for the radar subsystem antenna and laser, power conversion transformers to convert from direct to alternating current (e.g., 24 V dc to 120 V ac), and battery backups as needed.

The interconnection of these various subsystems is shown in block-diagram form in FIG. 4. The figure is divided into three primary sets: analysis elements 425, subsystem elements 465, and analysis functions 495. The analysis elements include the inspection technician 146, the Knowledgeable Observation Analysis-Linked Advisory System (KOALAS) 480, and a remote database 122 accessible by the fixed remote analysis system 120. Three functions performed as the inspection vehicle 12 follows the navigation path 202 in the illustrated embodiment include: (1) focussing 492 relevant subsystem elements on the individual structures to be analyzed; (2) extracting 494 features from each of the relevant structures; and (3) correlating 496 the location of those features both relatively with respect to the structure and absolutely with respect to ground position.

The inspection technician 146 interacts with the KOALAS system 480 through the CPU subsystem(s) 450 to control the subsystems 465 to perform such functions. For example, during a passage of the inspection vehicle 12 along the navigation path 202, the KOALAS system 480 activates the target recognition subsystem 460, which may consist of a gimbal-mounted stabilized CCD color camera or a 3–5 µm infrared thermal camera, for example. The target recognition system is configured to identify the structures, i.e. poles, to be analyzed. In certain embodiments, it is additionally configured to identify individual components of the structures, such as insulators on pole crossarms, and to localize the position of such components relative to the structures. Information provided by the target recognition subsystem is used to steer the radar antenna in the appropriate direction and to capture images of the pole structure for later use in data analysis.

Information detected by the target recognition system 460 is relayed back to the KOALAS system 480, where it can be accessed by the inspection technician 146 for modification as may be necessary. The KOALAS system 480, in conjunction with the inspection technician 146 uses that information to steer the radar antenna in a direction towards the pole. At the same time, the laser subsystem 430 is used to reflect coherent light off the structure to provide pertinent feedback data. The feedback data are used to provide the physical dimensions of each pole structure, including any cross arms that it may possess. Reflected laser light is also used to determine offset height and distances of each structure for calculation feedback to the differential GPS subsystem 440. The latitude and longitude positions of the inspection vehicle 12 are known from the GPS subsystem 440. With the height and distance information for each of the poles provided by the laser subsystem 430, the KOALAS system 480 performs the step of correlating positions 496 and thereby calculates the latitude and longitude positions of each pole studied for unique identification of those poles in the final report 115.

Figure 5A:
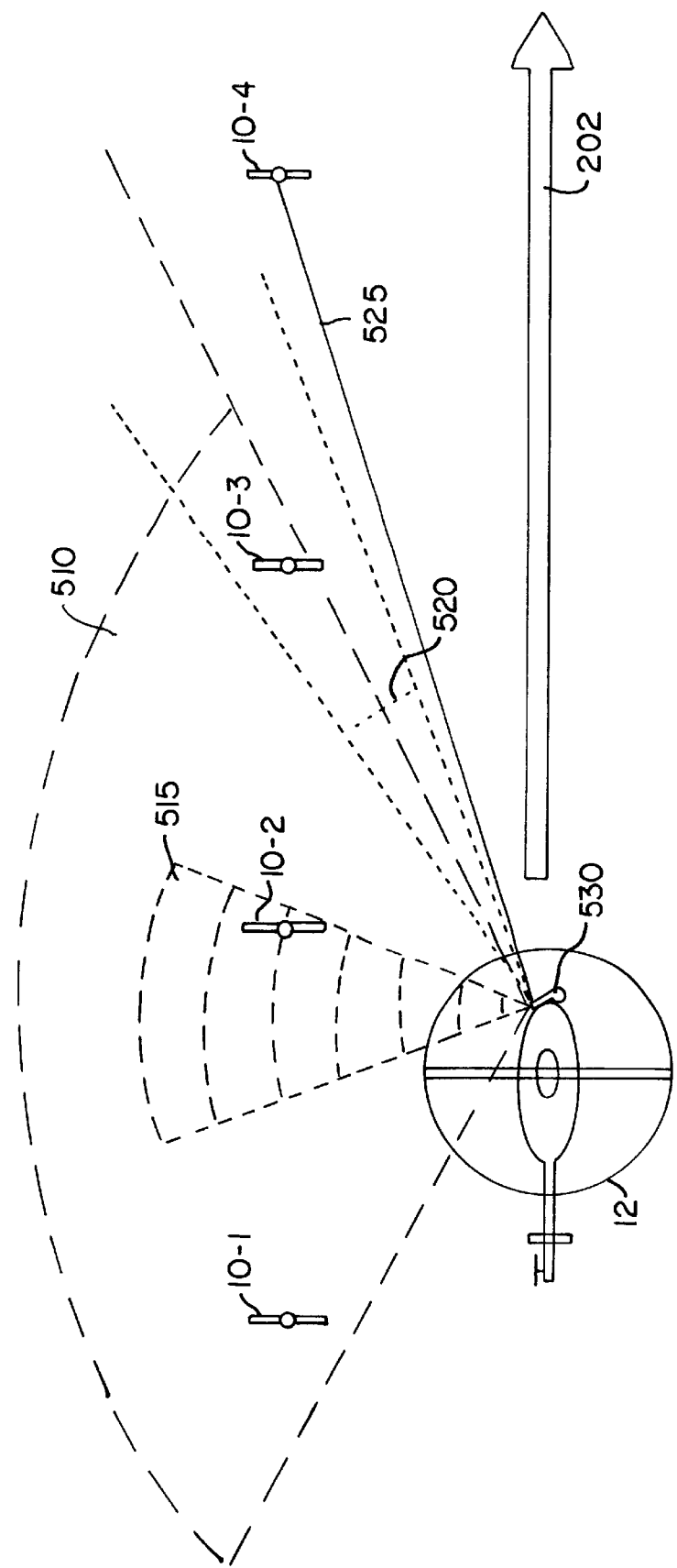
FIG. 5 is a schematic diagram showing the interaction of various sensor signals with poles: part (a) shows a top view and part (b) shows a side view.

In order to identify anomalies in the poles, two radar schemes may be used in conjunction. In one embodiment, both radar schemes are contained in the radar subsystem 410. For example, FIG. 4 shows a pulse compression radar subsystem 420 as an active component of the radar subsystem 410. Generally, the radar cross-section subsystem 410 uses a technique in which interferometric techniques are applied to account for the motion of the inspection vehicle 12 along the navigation path 202, thereby also increasing the effective spatial resolution of the system. In combination with measurements of reflected coherent light by the laser subsystem 430, the step of focussing on an individual pole 492 is accomplished. The pulse compression radar subsystem 420 uses a technique in which short radar pulses are modulated by long ones, thereby permitting improved range resolution by removing frequency and phase modulations. The information thus obtained is used to perform the step of extracting features that describe the condition of the pole, including identification of possible anomalies. The physical arrangement of the various signals that are used may be understood more clearly with reference to FIG. 5, which shows a top view in part (a) and a side view in part (b). As the inspection vehicle 12 moves along navigation path 202, signals are transmitted from a rotatable nose mount 530. For example, the radar cross-section signal 510 (long-dashed — — —) is transmitted continuously as the inspection vehicle 12 follows the navigation path 202. The radar cross-section subsystem 410 sends out a broad band pulse that is compressed upon reception. This signal is also integrated into the subsequent analysis. Thus, in FIG. 5(a), the pulse compression radar signal 515 is shown as a short-dashed line (----------), its frequency differing from the broad band pulse frequency. The target recognition signal 520, which may be an infrared signal, is shown as a dotted line (······). Finally, the distance to a pole, its physical dimensions, and overall shape are determined by reflection off the pole of a coherent laser signal 525, which is shown as a solid line (———).

After the data have been captured and stored onboard in the data storage system 470, a preliminary data reduction may be used to filter noise and thereby control the amount of data captured. Without such preliminary data reduction, approximately one terabyte of information is collected during a typical six-hour inspection day. The filtered data are transmitted to the analysis system 120 for more complete processing. Such data may be provided to the analysis system 120 in different ways. In one embodiment, data is written to a magnetic or optical recording medium, such as a CD or tape, and is physically transported to the analysis system 120. In another embodiment, the satellite link 140 (shown in FIG. 1) is used to transmit data. In one embodiment, the on-board KOALAS system 480 includes sufficient software to make a preliminary estimate of the structural integrity of the pole. Such software is a subset of the software described below used by the fixed remote analysis system 120 in its more detailed analysis, but permits an immediate evaluation of whether there is a strong likelihood that the pole is in catastrophic condition and in imminent danger of falling over. The results of such a preliminary analysis may be provided to the inspection technician 146 in the form of a red or green light, for example. Under such circumstances, the inspection technician 146 may make a determination of whether the entire structure was captured for analysis or whether a return inspection may be necessary.

In one embodiment, the following information is provided for use by the inspection technician 146 on the output interaction devices 306, 308, and 310. On a first of the devices 310 is displayed a moving map, indicating the present position of the inspection vehicle 12. On a second of the devices 306 is displayed identification information for the particular pole then under study. Such information includes its physical dimensions, latitude and longitude positions, and any identifying number assigned to it by the client. On a third of the devices 308 is displayed preliminary results of the radar analysis, permitting the inspection technician to decide whether to make additional measurements from different angular positions or to proceed along the navigation path.

Figure 6:
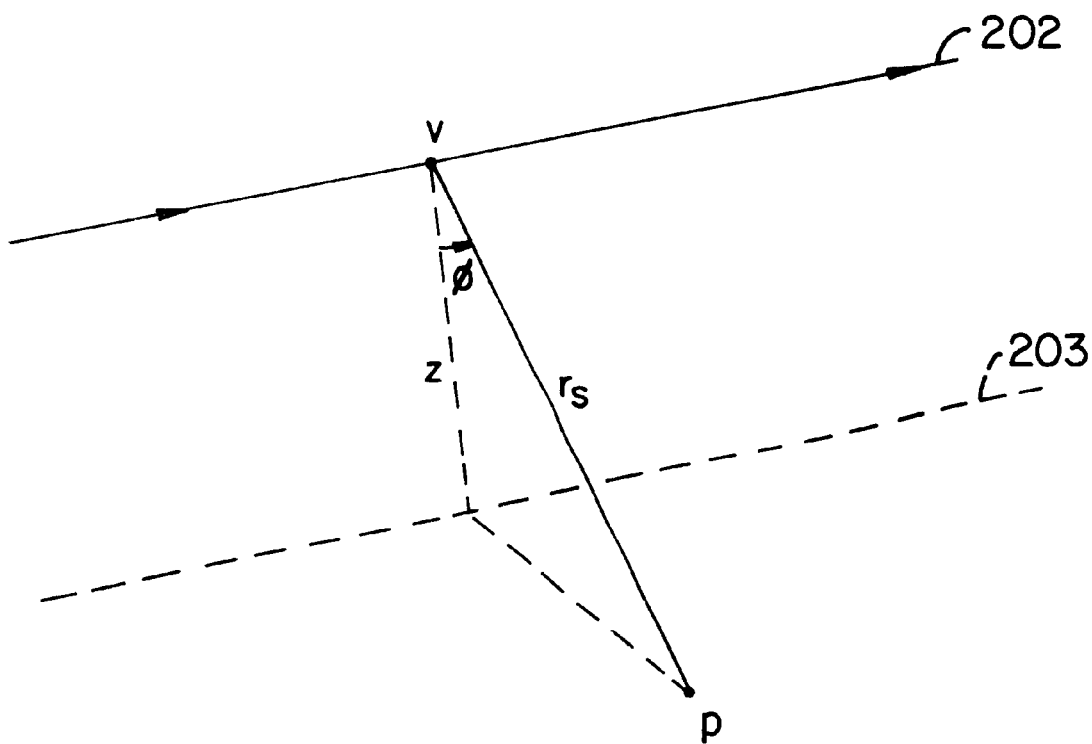
FIG. 6 is a representation of a cylindrical coordinate system.

The radar cross-section measurement system makes use of interferometric analyses to improve resolution, with measurements being taken at intervals as the inspection vehicle 12 moves along the navigation path 202. The resolution characteristics of the combined broad band and pulse compression modes may be understood by considering an analysis using a cylindrical coordinate system such as shown in FIG. 6. A cylindrical coordinate system naturally matches side-looking radar operations. In the figure, the inspection vehicle 12 at point V makes a measurement of a radar signal reflected from point P. The position of P is defined by the coordinates ($r_s$, ψ, z), with $r_s$ being the slant range, ψ being the look angle, and z being the azimuth (i.e. the distance between navigation path 202 and the nadir 203 projected on the surface of the earth).

For a radar system transmitting electromagnetic pulses of time duration τ, the sensor range resolution is Δr=cτ/2≈c/2Δf, where the time duration τ is approximately the inverse of the pulse bandwidth Δf. Use of a pulse compression ranging mode permits improved resolution by using modulated pulses. Thus, in one embodiment a chirp pulse is used, although other modulations may be used in alternative embodiments. The time dependence of the chirp pulse includes modulation with a rectangular pulse rect[t/τ] of duration τ:

$$A_i(t) = e^{i(\omega t + \alpha t^2/2)} \text{rect}(t/\tau),$$

where ω=2πf is the angular frequency associated with carrier frequency f and α is the chirp rate related to the pulse bandwidth by ατ=2πΔf. Without loss of generality, in the cylindrical coordinate system with a radar platform moving along the navigation path 202 and localized at z=0, and a target lying at P ($r_s$, ψ, 0) in the plane orthogonal to navigation path 202, the backscattered signal may be expressed as $$A = \exp\left[-\frac{i}{2}\left(\frac{2r}{c} + \left(\alpha\left(t - \frac{2r}{c}\right)\right)^2\right)\right]\text{rect}\left[\frac{t - 2r/c}{\tau}\right].$$

Processing of the received waveform is performed by convolution with a range reference function $$g(ct/2) = \exp\left[-\frac{i\alpha\tau^2}{2}\left(\frac{ct}{2}\right)^2\right]\text{rect}\left[\frac{ct}{2}\right],$$

resulting in $$\hat{A}(ct/2) = e^{-i(2\omega r/c)}\text{rect}\left[\frac{ct/2 - r}{c\tau}\right]\frac{\sin\left[\frac{\alpha\tau}{c}(ct/2 - r)\left(1 - \left|\frac{2}{c\tau}(ct/2 - r)\right|\right)\right]}{\frac{\alpha\tau}{c}(ct/2 - r)},$$

which for ct/2−r<<cτ can be written $$\hat{A}(ct/2) = e^{-4\pi i/\lambda}\text{sinc}\left(\frac{\pi(ct/2 - r)}{\Delta r}\right),$$

where λ is the wavelength associated with the carrier frequency. For a continuous distribution of scatterers described by a reflectivity pattern γ(r), the received pattern is given by $$\hat{\gamma}(ct/2) = \int dr\gamma(r)\hat{A}(ct/2 - r) = \int dr\gamma(r)e^{-4\pi i/\lambda}\text{sinc}\left(\frac{\pi(ct/2 - r)}{\Delta r}\right),$$

with resolution of two points $r_1$ and $r_2$ being possible for $|r_1 - r_2| \geq \Delta r$.

The azimuthal resolution is dictated by the constraint that two points at a given range not be within the radar beam at the same time. Accordingly, the azimuthal resolution Δz is related to the radar beamwidth by the relation Δz≈rλ/L, where r is the slant range and L is the effective antenna dimension along the azimuthal direction, i.e. along the navigation direction 202 in the configuration illustrated in FIG. 6. In the radar cross-section measurement system used in embodiments of the invention, the effective antenna dimension is increased by the motion of the inspection vehicle 12 and by coherently combining the backscattered echoes received and recorded along the navigation path 202.

Thus, for 2N+1 equally spaced positions of the antenna, located at $V_n(X_n + nd, r=0)$, and a point target P ($r_s$, ψ, 0), and isotropic radiation by the antenna within its beam width to provide an illuminated patch X=λr/L, the azimuthal-dependent part of the backscattered signal is given by $$A(nd) = e^{-i(2\pi/\lambda r)(nd)^2}.$$

In deriving this result, the expression $$\sqrt{r^2 + (nd)^2} \approx r + (nd)^2/2r$$

has been used. The received signal is processed by summing over all antenna positions and convolving with the azimuthal reference function $$g(nd) \approx e^{i(2\pi/\lambda r)(nd)^2}$$

to give $$\hat{A}(nd) = \sum_{k=-N}^{N} e^{-i(2\pi d^2/\lambda r)k^2} e^{i(2\pi d^2/\lambda r)(n-k)^2} \approx \frac{\sin\left(\frac{2\pi X d}{\lambda r}n\right)}{\sin\left(\frac{2\pi d^2}{\lambda r}n\right)} (nd \ll X).$$

As for the range results, the image of a point target is spread out. In the neighborhood of the target position at z=0, $$\hat{A}(nd) \approx \text{sinc}(\pi nd/\Delta z),$$

so that a distributed target is accounted for by superposition according to the reflectivity pattern in the azimuthal direction γ(z):

$$\hat{\gamma}(nd) = \int dz\gamma(z)\hat{A}(nd - z) = \int dz\gamma(z)\text{sinc}[\pi(nd - z)/\Delta z],$$

where the azimuthal resolution is Δz=L/2. Because the spatial bandwidth of estimated reflectivity γ is determined by the sinc function to be 1/Δz, the processed signal for any position along the navigation path 202 is determined by sampling interpolation:

$$\hat{\gamma}(z) = \Sigma\hat{\gamma}(nd)\text{sinc}[\pi(z - nd)/\Delta z] = \int dz'\gamma(z')\text{sinc}[\pi(z - z')/\Delta z].$$

Combining the range and azimuthal results provides the following overall image expression for radar signals reflected off an object having a two-dimensional reflectivity pattern γ(z,r):

$$\hat{\gamma}f(z,r) = e^{-i(2\omega r/c)}\int\int dz'dr'\gamma(z,r)\text{sinc}[\pi(z - z')/\Delta z]\text{sinc}[\pi(r - r')/\Delta r].$$

As noted, such analysis then provides a resolution capability for the radar system of Δr in the range direction and of Δz in the azimuthal direction.

Figure 7:
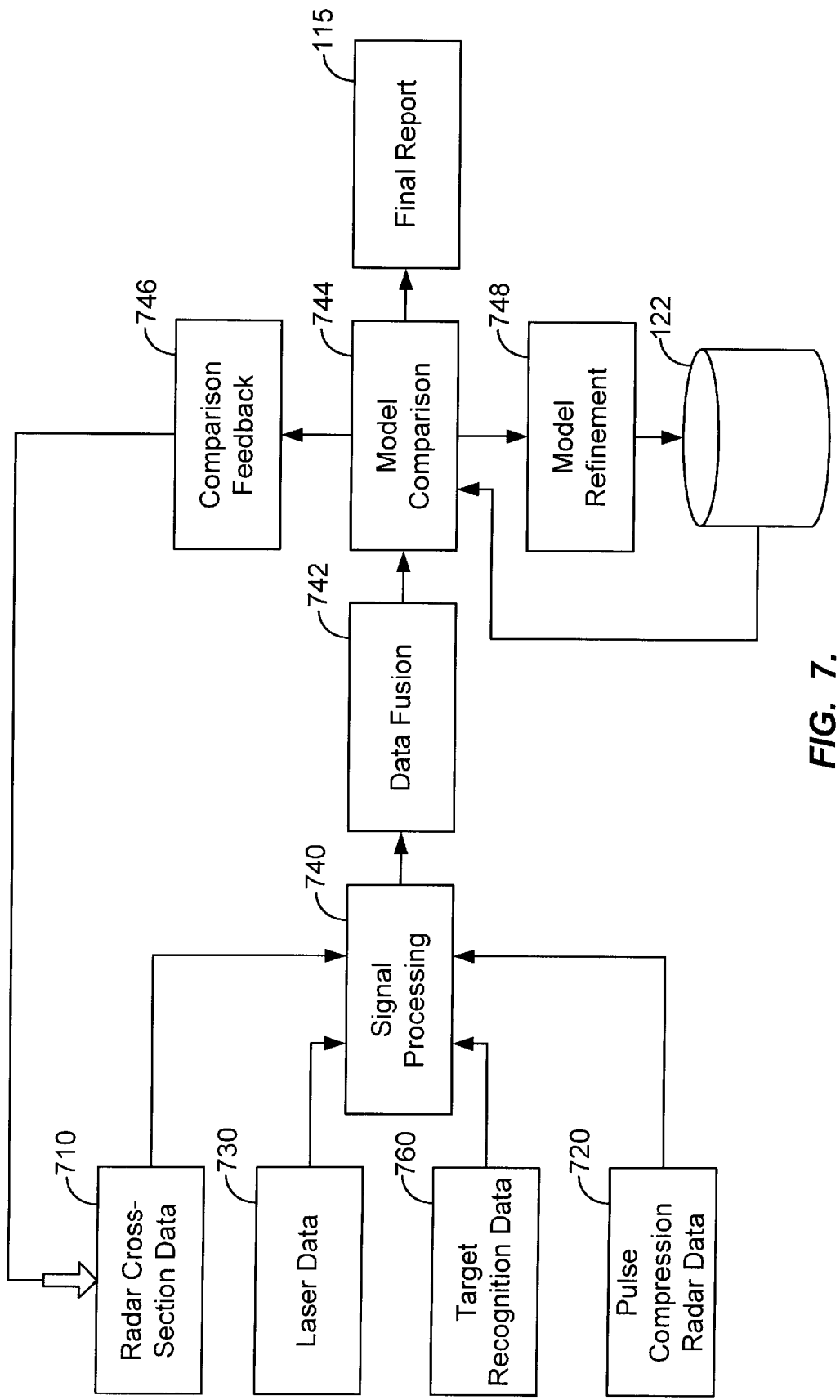
FIG. 7 is a block diagram showing the analysis of collected data.

A detailed overview of the analytical processing of the collected data is provided in FIG. 7. The various forms of data collected with the investigation vehicle 12, including radar cross-section measurement data 710, pulse compression radar data 720, laser data 730, target recognition data 730, and perhaps others, are subjected to a signal processing step 740 such as described in detail above. The various data are subject to data fusion 742, which is a method for combining results to increase the confidence level of the results presented in the final report 115. As an illustration, when the system makes a determination that characterizes a feature in a pole as an anomaly, the reliability of the determination is increased by calculating the product of probabilities from different sources. For example if $p_k$ is the probability that a given feature is an anomaly based on results from technique k, then the probability P that the feature is anomalous based on the use of multiple techniques is $$P = 1 - \Pi(1 - p_k)$$

The assignments of whether features in the structures are anomalous is performed in various embodiments at step 744 with an evaluation system that has been trained to discriminate between normal and anomalous structure according to the results of the measurements, such as with an expert system or neural network configuration. Such an evaluation system may rely on knowledge of the characteristics expected in normal or anomalous insulative materials as stored in database 122, the generation of which is further described below. For example, the expert system will have stored the density characteristics that define whether features are normal or anomalous and will have stored radar scattering signals that correspond to such densities.

The radar signals reflected from a particular pole 10 may be analyzed to identify, for example, density characteristics of the pole. Information characterizing the interior structure of the insulative material used to fabricate a particular component of the pole may be obtained by using radar signals having a frequency that penetrates that insulative material. For example, structures that are known to be fabricated from rubber may be studied with radar signals using infrared or x-ray frequencies. In one embodiment, radar signals that are transparent to the different materials that may be used to fabricate poles are used, including wood, rubber, ceramic, porcelain, and fiberglass. An appropriate frequency range for such studies is between 360 MHz and 8 GHz. In one embodiment, a frequency between 2 GHz and 6 GHz is used. Defects within the individual structures may be manifested by density changes or by the change in reflective characteristics that result from the defect. Thus, a void within a wooden structure, such as the central member or crossarm, causes a change in density that may be recognized as described below. A crack within an insulator that fills with water or metal has changed reflective properties that are evident at these radar frequencies.

Figure 8:
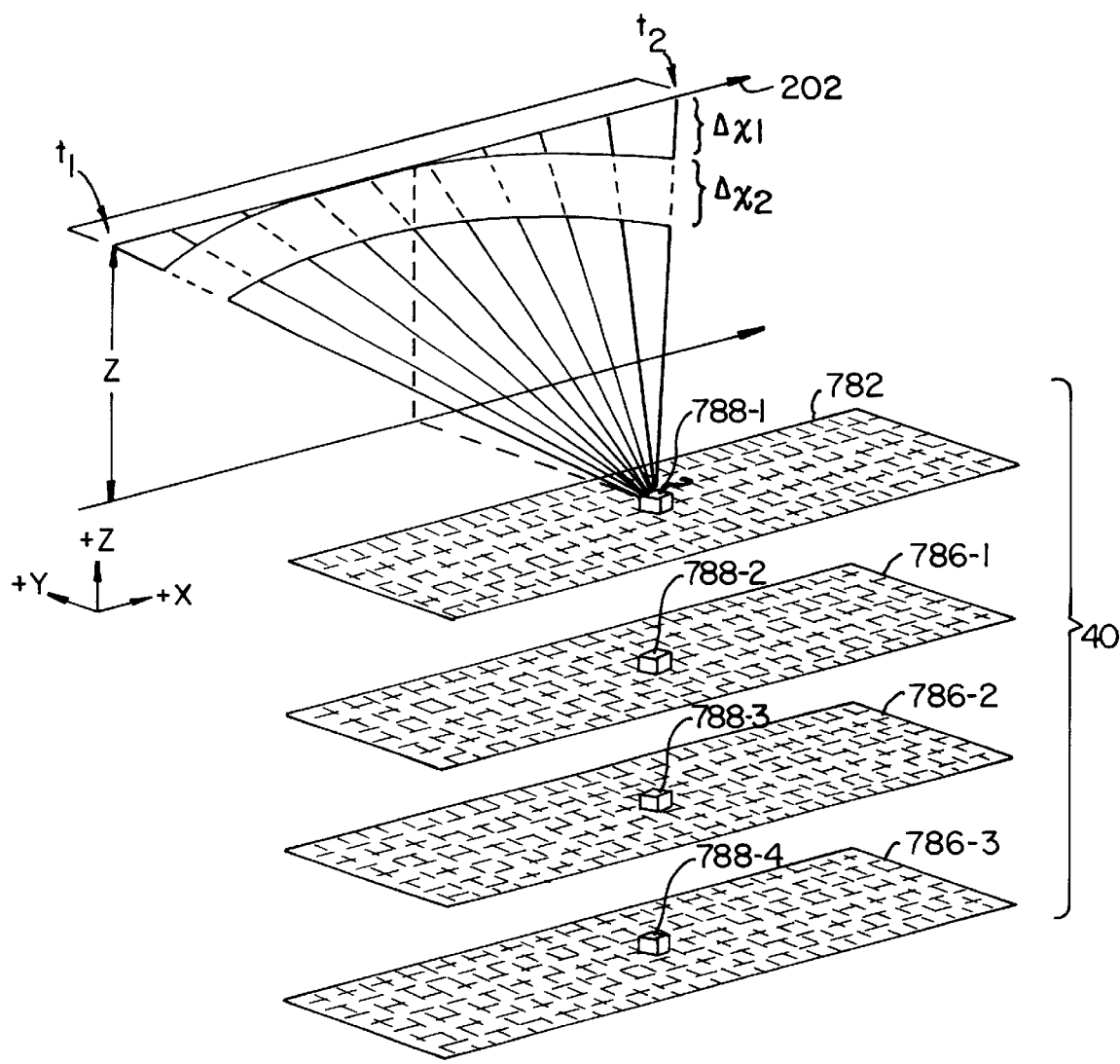
FIG. 8 is a schematic diagram of the insulative-material-penetrating aspects of the radar analysis.

In addition, phase shifts resulting from the different refractive effects of the insulative material and air through which the radar signals are propagated permits resolution of features and their positions within the insulative material. The analysis is illustrated in FIG. 8, in which the pole 10 is shown schematically as including a pole surface 782 and a series of planes 786 throughout the pole. The pole is subdivided into a plurality of individual cells 788 for individual characterization.

As the inspection vehicle 12 (not shown in FIG. 8) moves along navigation path 202, the radar signal for a particular cell 788-1 is first sensed at time $t_1$ and last sensed at time $t_2$. There are two focussing functions that are used to define the particular cell 788-1. First, a planar coordinate position, shown in Cartesian coordinates (x, y) in the figure for convenience, causes a first phase shift $\Delta\psi_1$ that varies with the motion of the inspection vehicle 12. Second, refractive effects associated with the depth of the particular cell 788-1 within the pole 10 cause a second phase shift $\Delta\psi_2$, which remains uniform with the motion of the inspection vehicle 12. Focussing for the planar coordinate position is a straightforward phase correction that accounts for path length differences between a current position of the inspection vehicle 12 and the closest approach of the inspection vehicle 12. Depth focussing is accomplished by using an insulative-material refractive propagation model, such as a wood refractive propagation model in certain embodiments, to determine the effective path length difference between the pole surface 782 and the particular plane 786 within the pole, including the propagation delay that results from the different index of refraction in the insulative material.

Such analysis can thus provide, for example, a relative measure of the density distribution of the insulative material throughout a component of the pole. By recognizing in particular closed volumes within the pole where the density is consistently less than the mean density of that region, structural anomalies are identified, together with their location. For example, a potential anomaly within the central member or a crossarm is identified by its density being less that the average density of the central member or crossarm in that region. Since the comparison is of a relative measure of the density, the method can function independent of knowing precisely what type of insulative material any particular component of the pole is made of.

The process of drawing these conclusions by performing the model comparison 744 is essentially a pattern-recognition algorithm being conducted by the trained evaluation system. In any specific implementation of such a pattern-recognition algorithm, it is beneficial to ensure that the trained evaluation system is making reliable determinations. This may be done by preliminary training of the evaluation system with an appropriate set of certifiable data that accounts for relevant factors in making the determinations, which is then encoded before the system is used to evaluate real data. For example, measurements may be performed on a number of poles, some of which are known to contain anomalies. Based on the identification of these anomalies, this information is used to train the evaluation system's pattern recognition algorithm. In particular, the preliminary training may include a pole strength assessment (perhaps expressed as a percentage probability that the pole will fail within a certain time as a result of the anomaly) determined from a complete analysis of the pole external from the radar measurements.

Using artificial-intelligence techniques, the results of subsequent tests are used continually to perform refinement of the model used in making the structural determinations (step 748). For example, in one embodiment, a neural net is used to make the structural determinations. A typical neural network includes a plurality of nodes, each of which has a weight value associated with it. The network includes an input layer having a plurality of input nodes and an output layer having a plurality of output nodes, with at least one layer therebetween. In this example, the input nodes receive the data provided by the various sensor measurements and the output nodes generate an interpretation designation. The interpretation designation may be a simple binary indication, such as described above, that a given pole is imminently likely to collapse or not. Alternatively, the interpretation designation may be a numerical percentage reflecting the pole strength assessment. In other words, given an input comprising the sensor measurements, the input is combined (added, multiplied, subtracted, etc. in a variety of combinations and iterations depending upon how the neural network is initially organized), and then the interpretation is generated accordingly.

In order to train the neural net, the output values are compared against the correct interpretation with some known samples. If the output value is incorrect when compared against such a test interpretation, the neural net modifies itself to arrive at the correct output value. This is achieved by connecting or disconnecting certain nodes and/or adjusting the weight values of the nodes during the training through a plurality of iterations. Once the training is completed, the resulting layer/node configuration and corresponding weights represents a trained neural net. The trained neural net is then ready to receive unknown sensor data and designate certain pole regions as containing anomalies. Classical neural nets include Kohonen nets, feed-forward nets, and back-propagation nets. The different neural nets have different methods of adjusting the weights and organizing the respective neural net during the training process.

The analysis system may make use of other methods for making insulative-structure anomaly assignments on the basis of the sensor data. Such methods may be broadly categorized as falling into one of two classes. In the first class, the method begins with an initial approximation that is progressively improved using comparison feedback (step 746). For example, for a given pole, the analysis system begins with an initial structural estimate for the pole. The sensor data that would result from a pole with those precise characteristics is calculated and compared with the actual sensor data. From such a comparison, the estimated structural characteristics for the pole are refined. The process proceeds iteratively, with the estimated pole structure being modified at each step to reproduce the measured sensor data more closely. When the difference between the measured sensor data and the calculated sensor data is less than a predetermined threshold, the process is deemed to have converged and the final report 115 is issued.

In the second class of methods, the system is permitted to vary essentially randomly and individual pole-characteristic representations that develop during the process are evaluated to determine which best reproduces the measured sensor data. One example of such a method is a genetic algorithm. The genetic algorithm is a model of machine learning that derives its behavior in an attempt to mimic evolution in nature. This is done by generating a population of "individuals," i.e. pole-characteristic representations, represented by "chromosomes," in essence a set of character strings that are analogous to the base-four chromosomes of DNA. The individuals in the population then go through a process simulated "evolution." The genetic algorithm is widely used in optimization problems in which the character string of the chromosome can be used to encode the values for the different parameters being optimized. In practice, therefore, an array of bits or characters to represent the chromosomes, in this case the position and sizes of anomalies in the insulative structures of a pole, is provided; then, bit manipulation operations allow the implementation of crossover, mutation, and other operations.

When the genetic algorithm is implemented, it is trained in a manner that may involve the following cycle: the fitness of all individuals in the population is first evaluated; then, a new population is created by performing operations such as crossover, fitness-proportionate reproduction, and mutation on the individuals whose fitness has just been measured; finally, the old population is discarded and iteration is performed with the new population. One iteration of this loop is referred to as a generation. According to embodiments of the present invention, a number of randomly generated poles with various anomalies may be used as the initial input. This population of poles is then permitted to evolve as described above, with each individual pole being tested at each generation to see whether it can adequately reproduce the measured sensor data.

Figure 9:
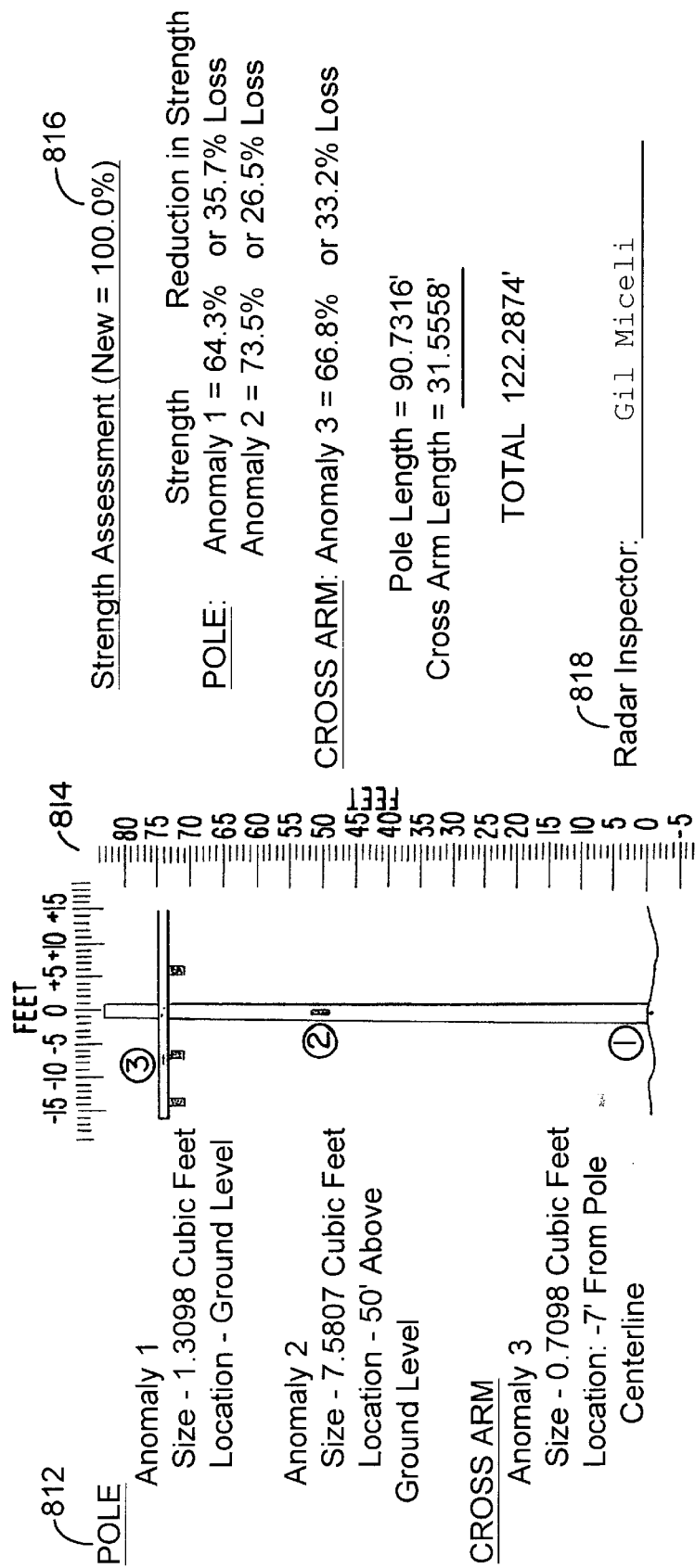
FIG. 9 is an example of a pole inspection report that may be provided in accordance with embodiments of the invention.

Still further methods that may occur to those of skill in the art, involving such techniques as simulated annealing or various fuzzy logic systems, may be used alternatively or supplementally to perform the analysis of the measured sensor data to generate the final report 115. An example of the format of the final report 115 and the type of information included on it is shown in FIG. 9. The final report 115 may comprise of a plurality of such depictions as shown in FIG. 9, one for each pole examined, and may include information in more summary form such as in a table.

In the report format shown in FIG. 9, preliminary information is used to identify the name of a client 802 who commissioned the investigation of the pole structures and the date 804 the inspection was performed. Specific information identifying the individual pole for the report may take the form of providing a pole number 806 and line name 808; in this example the report is for pole 17 of 354 poles on the Rio Osa—Table Mountain 69 kV line. The specific location 810 of the pole, determined as described above, is provided in a format specifying longitude and latitude to facilitate identification of the pole should remedial measures be warranted and/or desired. The report includes information reporting the results of the analysis. Such information may be in the form of a graphic 814 showing the general size and shape of the pole, with an indication of where detected anomalies lie. It may also include a textual description 812 of the location of the anomalies, using ground level and the pole centerline as reference points. The report may further include a quantitative evaluation 816 of the effect on pole strength caused by the various detected anomalies. The identity of the inspection technician may also be included.

In the example shown, the system has detected three anomalies in the pole, which has a single crossarm. The first anomaly is approximately at ground level in the vertical pole having a size of about 1.3098 ft$^3$. Based on the analysis system, using a trained evaluation system such as an expert system or neural network, this anomaly is estimated to reduce the strength of the pole by 35.7% from its strength without the anomaly. The second anomaly is larger and located about 50 ft above ground level and the third anomaly, which is smaller, is located in the crossarm. The estimated effect of each of these anomalies on the strength of the pole is included in the report. This information may then be used by the client to decide whether to take corrective action based on its own criteria, such as to replace any structure suffering from a strength reduction greater than 40%.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for identifying an anomaly in an electrically insulative component of a structure, the method comprising:

identifying a location for the structure;

identifying a position for the electrically insulative component;

propagating a first radar signal towards the electrically insulative component with a radar antenna while the radar antenna is in motion along a navigation path in the vicinity of the structure;

receiving a reflected radar signal from the electrically insulative component; and determining whether the electrically insulative component contains the anomaly from the reflected radar signal.

2. The method according to claim 1 wherein the first radar signal has a frequency between 360 MHz and 8 GHz.

3. The method according to claim 2 wherein the first radar signal has frequency between 2 and 6 GHz.

4. The method according to claim 1 wherein identifying a location for the structure comprises imaging the structure and wherein identifying a position for the electrically insulative component comprises imaging the electrically insulative component.

5. The method according to claim 4 wherein imaging the structure and imaging the electrically insulative component are performed with a charge coupled device.

6. The method according to claim 4 wherein imaging the structure and imaging the electrically insulative component are performed at infrared electromagnetic wavelengths.

7. The method according to claim 4 wherein propagating a first radar signal towards the electrically insulative component comprises steering the radar antenna in a direction determined by imaging the electrically insulative component.

8. The method according to claim 1 wherein identifying the location for the structure comprises ascertaining longitude and latitude positions for the structure with a ground positioning subsystem (GPS).

9. The method according to claim 1 wherein identifying the location for the structure comprises reflecting a laser signal from the structure.

10. The method according to claim 1 further comprising propagating a second radar signal towards the electrically insulative component, wherein such second radar signal is modulated in accordance with a pulse compression scheme and wherein the reflected radar signal includes signal components originating from both the first and second radar signals.

11. The method according to claim 10 wherein the second radar signal has a different frequency than the first radar signal.

12. The method according to claim 1 wherein determining whether the electrically insulative component contains the anomaly is performed by a trained evaluation system.

13. The method according to claim 12 wherein the trained evaluation system comprises a neural net.

14. The method according to claim 12 wherein the trained evaluation system comprises an expert system.

15. The method according to claim 1 wherein the electrically insulative component is a central member of a utility pole.

16. The method according to claim 1 wherein the electrically insulative component is a crossarm of a utility pole.

17. The method according to claim 16 further comprising reflecting a laser signal from the utility pole to ascertain a shape and physical dimensions of the utility pole.

18. The method according to claim 1 wherein the electrically insulative component is an insulator on a utility pole.

19. A method for identifying an anomaly in an electrically insulative component of a utility pole, the method comprising:
  imaging the utility pole to determine a location for the utility pole;
  imaging the electrically insulative component to determine a position for the electrically insulative component;
  steering a radar antenna in a direction towards the determined position for the electrically insulative component;
  propagating a first radar signal towards the electrically insulative component with the radar antenna while the radar antenna is in motion along a navigation path in the vicinity of the utility pole, wherein the first radar signal has a frequency between 360 MHz and 2 GHz;
  receiving a reflected radar signal from the electrically insulative component; and
  determining whether the electrically insulative component contains the anomaly from the reflected radar signal.

20. The method according to claim 19 further comprising ascertaining longitude and latitude positions for the utility pole with a ground positioning system (GPS).

21. The method according to claim 19 further comprising propagating a second radar signal towards the electrically insulative component, where such second radar signal has a different frequency that the first radar signal and is modulated in accordance with a pulse compression scheme and wherein the reflected radar signal includes signal components originating from both the first and second radar signals.

22. The method according to claim 19 wherein the electrically insulative component is a central member of the utility pole.

23. The method according to claim 19 wherein the electrically insulative component is a crossarm of the utility pole.

24. The method according to claim 19 wherein the electrically insulative component is an insulator on the utility pole.

25. A system for identifying an anomaly in an electrically insulative component of a structure, the system comprising:
  a target-recognition device configurable for connection with a vehicle;
  a rotatable radar antenna configurable for connection with the vehicle;
  an arrangement of at least one computer system in communication with the target-recognition device and rotatable radar antenna and configured to accept instructions from an operator and to operate the target-recognition device and rotatable radar antenna in accordance with the following:
    identifying a location for the structure with the target recognition device;
    identifying a position for the electrically insulative component with the target recognition device;
    propagating a first radar signal towards the electrically insulative component with the radar antenna while the radar antenna is in motion along a navigation path in the vicinity of the structure;
    receiving a reflected radar signal from the electrically insulative component; and
    determining whether the electrically insulative component contains the anomaly from the reflected radar signal.

26. The system according to claim 25 wherein the target-recognition device comprises an imaging device.

27. The system according to claim 26 wherein the target-recognition device comprises a charge coupled device.

28. The system according to claim 26 wherein the target-recognition device comprises an infrared camera.

29. The system according to claim 25 wherein the arrangement of at least one computer system is configured such that propagating the first radar signal towards the electrically insulative component with the radar antenna comprises steering the radar antenna in a direction determined by imaging the electrically insulative component with the target-recognition device.

30. The system according to claim 25 further comprising a ground positioning subsystem (GPS) in communication with the arrangement of at least one computer system and configurable for connection with the vehicle, and
  wherein the arrangement of at least one computer system is configured such that identifying the location for the structure comprises ascertaining longitude and latitude positions for the structure with the GPS.

31. The system according to claim 25 further comprising a laser subsystem in communication with the arrangement of at least one computer system and configurable for connection with the vehicle, and wherein the arrangement of at least one computer system is configured such that identifying the position for the electrically insulative component comprises reflecting a laser signal from the electrically insulative component with the laser subsystem.

32. The system according to claim 25 wherein the arrangement of at least one computer system is further configured in accordance with propagating a second radar signal towards the electrically insulative component with the radar antenna, wherein such second radar signal is modulated in accordance with a pulse compression scheme and wherein the reflected radar signal includes signal components originating from both the first and second radar signals.

33. The system according to claim 32 wherein the second radar signal has a different frequency than the first radar signal.

34. The system according to claim 25 wherein determining whether the electrically insulative component contains the anomaly is performed by a trained evaluation system configured within the arrangement of at least one computer system.

35. The system according to claim 34 wherein the trained evaluation system comprises a neural net.

36. The system according to claim 34 wherein the trained evaluation system comprises an expert system.

37. The system according to claim 25 wherein the electrically insulative component is a central member of the utility pole.

38. The system according to claim 25 wherein the electrically insulative component is a crossarm of the utility pole.

39. The system according to claim 25 wherein the electrically insulative component is an insulator on the utility pole.

* * * * *